US009611930B2

United States Patent
Marathe et al.

(10) Patent No.: US 9,611,930 B2
(45) Date of Patent: Apr. 4, 2017

(54) LUBRICATION OF POWER TRAIN COMPONENTS

(71) Applicant: Deere & Company, Moline, IL (US)

(72) Inventors: Amey V. Marathe, Pune (IN); Amol Sambhe, Badnera (IN); Prashant Navghare, Akola (IN); Douglas S. Base, Coffeyville, KS (US); Timothy B. French, Dubuque, IA (US); Asheesh Maharana, Bhubaneswar (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/635,812

(22) Filed: Mar. 2, 2015

(65) Prior Publication Data

US 2015/0267803 A1 Sep. 24, 2015

Related U.S. Application Data (60) Provisional application No. 61/968,095, filed on Mar. 20, 2014.

(51) Int. Cl.
*F16H 57/04* (2010.01)

(52) U.S. Cl.
CPC ....... *F16H 57/0457* (2013.01); *F16H 57/042* (2013.01); *F16H 57/0483* (2013.01)

(58) Field of Classification Search
CPC ............... F16H 57/042; F16H 57/0421; F16H 57/0423; F16H 57/0424; F16H 57/0457; F16H 57/0483
See application file for complete search history.

(56) References Cited

U.S. PATENT DOCUMENTS

| | | | | |
|---|---|---|---|---|
| 2,618,359 A | * | 11/1952 | Alden | F16H 3/64 184/11.1 |
| 3,383,937 A | * | 5/1968 | Toenne | F16C 19/548 184/11.1 |
| 3,650,353 A | * | 3/1972 | Abbott | F16H 57/0457 184/6.12 |

(Continued)

FOREIGN PATENT DOCUMENTS

| | | |
|---|---|---|
| DE | 1939717 | 2/1971 |
| DE | 112008001237 | 4/2010 |

(Continued)

OTHER PUBLICATIONS

Search Report for related German Application No. DE2015204898.5, dated Jul. 2, 2015.

*Primary Examiner* — Minh Truong
(74) *Attorney, Agent, or Firm* — Lorenz & Kopf, LLP (57) ABSTRACT

A lubrication apparatus for lubrication of one or more components is described. The apparatus may include a housing with an internal housing cavity containing lubrication fluid. A catchment feature may be located on an internal portion of the housing, the catchment feature having a lip and a reservoir, with the lip extending into the internal housing cavity above, at least in part, a lubrication fluid sump level of the internal housing cavity. A first lubrication passage may extend from the catchment feature into the housing. The lip and the reservoir of the catchment feature may catch lubrication fluid splashed above the lubrication fluid sump level. The first lubrication passage may direct lubrication fluid from the catchment feature to the one or more components.

14 Claims, 8 Drawing Sheets

(56) References Cited

U.S. PATENT DOCUMENTS

| | | | | |
|---|---|---|---|---|
| 4,824,264 A * | 4/1989 | Hoebel | ................ | F16C 19/386 |
| | | | | 384/473 |
| 5,505,112 A | 4/1996 | Gee | | |
| 6,481,541 B2 * | 11/2002 | Taki | ........................ | F16D 55/40 |
| | | | | 188/71.5 |
| 6,840,363 B2 * | 1/2005 | Braford, Jr. | ............. | F16D 13/52 |
| | | | | 192/106 F |
| 7,464,626 B2 * | 12/2008 | Yamazaki | ............ | B60K 17/344 |
| | | | | 192/35 |
| 8,678,784 B2 * | 3/2014 | Atarashi | .................. | B60K 6/26 |
| | | | | 417/372 |
| 9,303,696 B2 * | 4/2016 | Phelps | .................... | F16D 13/74 |
| 9,303,754 B2 * | 4/2016 | Nett | .................... | F16H 57/0424 |
| 2007/0149339 A1 | 6/2007 | Weith | | |
| 2009/0176614 A1 | 7/2009 | Hilker et al. | | |
| 2012/0031727 A1 * | 2/2012 | Nett | .................... | F16H 57/0409 |
| | | | | 192/113.1 |
| 2012/0181113 A1 | 7/2012 | Alecu et al. | | |
| 2015/0057125 A1 * | 2/2015 | Pump | ..................... | F16H 48/08 |
| | | | | 475/160 |

FOREIGN PATENT DOCUMENTS

| | | | | |
|---|---|---|---|---|
| DE | EP-2574827 A1 * | 4/2013 | ......... | F16H 57/0424 |
| WO | 2012173795 A1 | 12/2012 | | |

\* cited by examiner

LUBRICATION OF POWER TRAIN COMPONENTS

CROSS-REFERENCE TO RELATED APPLICATION(S)

This application claims priority to U.S. Provisional Application 61/968,095, which was filed on Mar. 20, 2014.

STATEMENT OF FEDERALLY SPONSORED RESEARCH OR DEVELOPMENT

Not applicable.

FIELD OF THE DISCLOSURE

This disclosure relates to lubrication of moving components, including shaft-mounted rotating components in the power train of a vehicle.

BACKGROUND OF THE DISCLOSURE

In various settings and applications, it may be useful to lubricate power transmission components in order to reduce damage to the components, protect them from excessive wear, and so on. In various configurations, lubrication can be implemented via a sump of lubrication fluid (e.g., lubricating oil) into which a portion of various moving components may extend. For example, as various components within a power transmission rotate, they may pass through a lubrication sump (e.g., a sump formed by a housing of the components) for direct lubrication.

Depending on the configuration of a fluid-containing case (e.g., a housing of a transmission with an internal oil sump) and other factors, the level of lubrication fluid in a lubrication sump may vary from negligible levels of fluid to levels exceeding the centerline of various rotating parts (e.g., a power transmission shaft and associated components within a transmission housing). Further, sump levels may vary between various static oil levels (including static levels at various vehicle tilt from normal) and dynamic oil levels (i.e., sump levels during operation of the power transmission or other components).

Various issues may accordingly arise with regard to certain approaches to lubricating power transmission components. For example, an overly high static (or other) oil level in a power transmission case may impose excessive parasitic losses on the associated transmission of power (e.g., through the large windage losses of components rotating through the oil). Further, unexpected or unavoidable variation in the level of the sump may result in inadequate lubrication of various components.

SUMMARY OF THE DISCLOSURE

A lubrication system is disclosed for lubricating various mechanisms, for example, including a parking brake mounted around and rotating with a differential drive shaft of a vehicle.

According to one aspect of the disclosure, a lubrication apparatus includes a housing with an internal housing cavity containing lubrication fluid. The lubrication apparatus includes a catchment feature and a first lubrication passage extending from the catchment feature into the housing. The catchment feature includes a lip and a reservoir, the lip extending into the internal housing cavity above, at least in part, a lubrication fluid sump level of the internal housing cavity. The first lubrication passage directs lubrication fluid from the catchment feature to one or more components.

One or more of the following features may be included in the disclosed lubrication system. For example, a second lubrication passage may vent air away from the one or more components and drain lubrication fluid away from the one or more components. One of the components may include a first bearing supporting a rotatable shaft. The lubrication apparatus may also include a component cavity containing, at least in part, a second component. The first bearing may be located on a first side of the component cavity. The lubrication apparatus may include a first annular gap providing a first annular flow path between the component cavity and the first bearing. Lubrication fluid may flow through the first annular flow path between the component cavity and the first bearing to lubricate the second component. The second component may surround, at least in part, the rotatable shaft and may include a park brake mounted to the rotatable shaft. A piston of the park brake, in a first configuration, may block a flow path of lubrication from the internal housing cavity into the component cavity.

The lubrication apparatus may include a second bearing supporting the rotatable shaft and located on a second side of the component cavity. The lubrication apparatus may also include a second annular gap providing a second annular flow path between the component cavity and the second bearing. Lubrication fluid may flow through the second annular flow path between the component cavity and the second bearing to lubricate the second component.

The lubrication apparatus may include one or more slots in an inner wall of the component cavity and a groove in fluid communication with the one or more slots along with one or more drainage passages in fluid communication with the groove. The one or more slots, the groove, and the one or more drainage passages together may provide, at least in part, a flow path between the component cavity and the internal housing cavity.

According to another aspect of the disclosure, a lubrication apparatus includes a lubrication fluid pump and a housing having a component cavity containing, at least in part, a first component. A first bearing supports a rotatable shaft and is located on a first side of the component cavity. A first lubrication passage directs lubrication fluid from the lubrication fluid pump to the component cavity, via the first bearing. A first annular gap provides a first annular flow path between the component cavity and the first bearing and lubrication fluid flows through the first annular flow path between the component cavity and the first bearing to lubricate the first component.

One or more of the following features may be included in the disclosed lubrication apparatus. For example, a second lubrication passage may vent air away from the one or more components and drain lubrication fluid away from the one or more components. The first component may surround, at least in part, the rotatable shaft and include a park brake mounted to the rotatable shaft. A piston of the park brake, in a first configuration, may block a flow path of lubrication from the internal housing cavity into the component cavity.

The lubrication apparatus may include a second bearing supporting the rotatable shaft and is located on a second side of the component cavity. The lubrication apparatus may also include a second annular gap providing a second annular flow path between the component cavity and the second bearing. Lubrication fluid may flow through the second annular flow path between the component cavity and the second bearing to lubricate the first component.

The lubrication apparatus may include one or more slots in an inner wall of the component cavity and a groove in fluid communication with the one or more slots along with one or more drainage passages in fluid communication with the groove. The one or more slots, the groove, and the one or more drainage passages together may provide, at least in part, a flow path away from the component cavity.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed lubrication apparatus, as shown in the accompanying figures of the drawings described briefly above. Various modifications to the example embodiments may be contemplated by one of skill in the art.

As will become apparent from the discussion herein, the disclosed lubrication apparatus may be used advantageously in a variety of settings and with a variety of machinery. For example, the lubrication apparatus may be utilized in a variety of work vehicles with respect to a variety of components, including a variety of moving components. In certain embodiments, as also described below, the lubrication apparatus may be utilized with respect to a rotating component surrounding a rotating shaft.

The passage of rotating (and other moving) components through a lubrication fluid sump may splash lubrication fluid (e.g., oil) in various directions, may carry fluid by surface forces out of the sump, and may otherwise distribute fluid above the nominal sump level. In certain embodiments, the disclosed apparatus may capture portions of this distributed lubrication fluid oil for beneficial use. For example, in certain embodiments, a catchment feature, such as a lipped reservoir, may be formed on an interior surface of a transmission housing (e.g., a differential housing), and may beneficially capture a portion of splashed oil.

Various other benefits will also be apparent, including the management of oil routing and the venting of enclosed air. For example, oil from a catchment feature (e.g., as described above) or another source may be directed through lubrication passages to various components in or around a relevant housing. Further, lubrication passages may allow fluid flow between these various components and various areas, thereby facilitating drainage of oil, venting of gases (e.g., to prevent damming of oil by trapped air), and other beneficial effects.

In certain embodiments, lubrication passages may direct fluid (e.g., from a catchment feature) to bearings that support an associated shaft. For example, in a differential case (or housing), lubrication passages may route oil from a catchment feature to one or both of an outer "tail" and inner "head" bearing that support a differential drive shaft. Lubrication passages, including annular passages, may additionally or alternatively route oil from the bearings to other rotating components, including components mounted on the drive shaft between the bearings. Further, lubrication passages may drain oil from various areas of the system (e.g., around the bearings or other rotating components) or vent air that might otherwise become trapped within the apparatus (and thereby impede appropriate lubrication).

Figure 1:
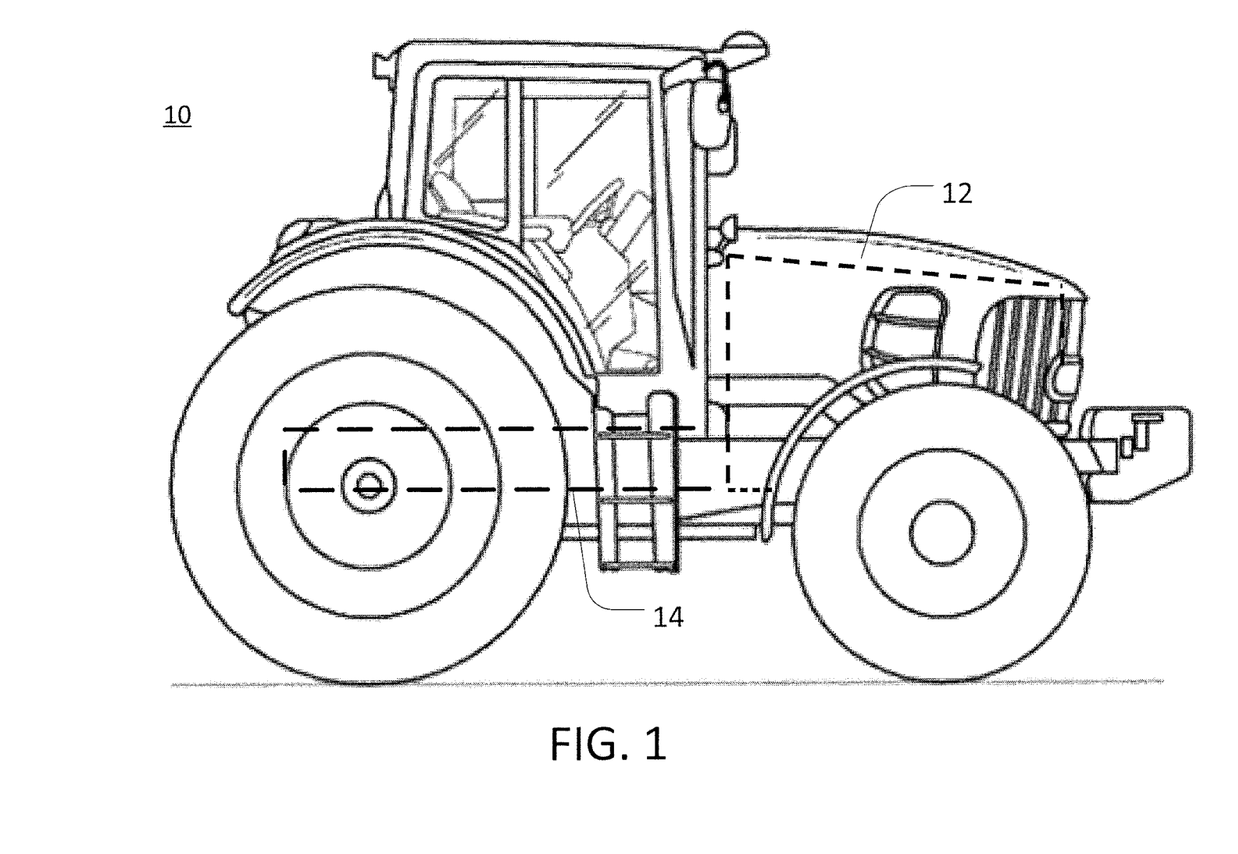
FIG. 1 is a side view of an example vehicle with respect to which a lubrication apparatus may be implemented.

Referring now to FIG. 1, a vehicle 10 is depicted (e.g., a work vehicle), which may include power source 12 (e.g., an internal combustion engine) and transmission 14 (e.g., a series of mechanical or other transmission elements). Although vehicle 10 is depicted in FIG. 1 as a tractor, it will be understood that the disclosed apparatus may be implemented with respect to a variety of vehicle types including forestry vehicles (e.g., skidders or feller-bunchers), construction vehicles (e.g., loaders or backhoes), and so on. It will also be understood that, in certain embodiments, the disclosed lubrication apparatus may be utilized in non-vehicle platforms for lubrication of moving components. Further, although certain examples discussed herein may relate to lubrication of components associated with a differential, including a shaft-mounted park brake, it will be understood that the principles underlying these examples may be beneficially extended to a variety of lubrication settings.

Figure 2:
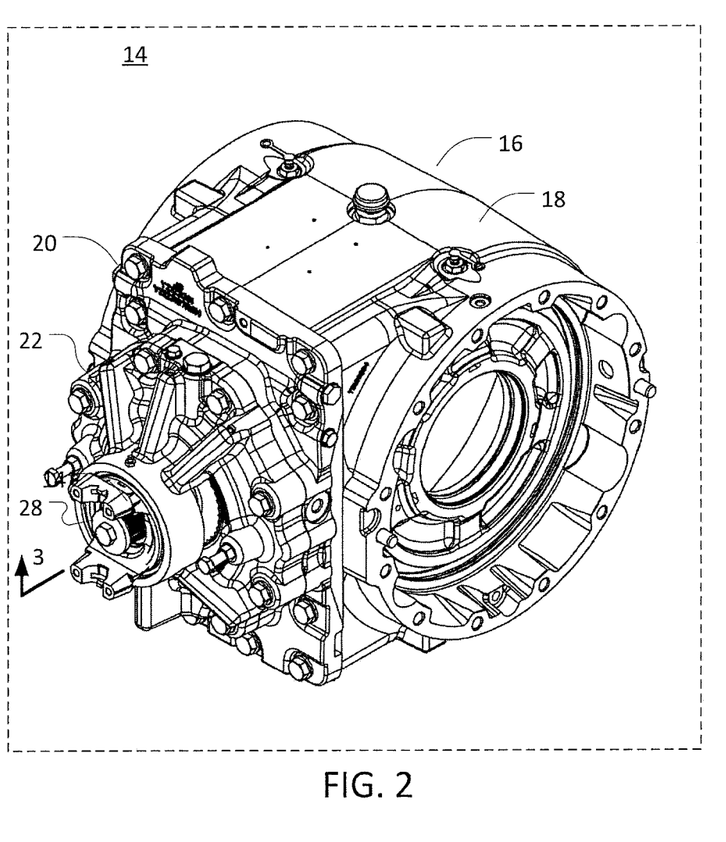
FIG. 2 is a perspective view of a differential of the vehicle of FIG. 1, with respect to which the lubrication apparatus may be implemented.
Figure 3:
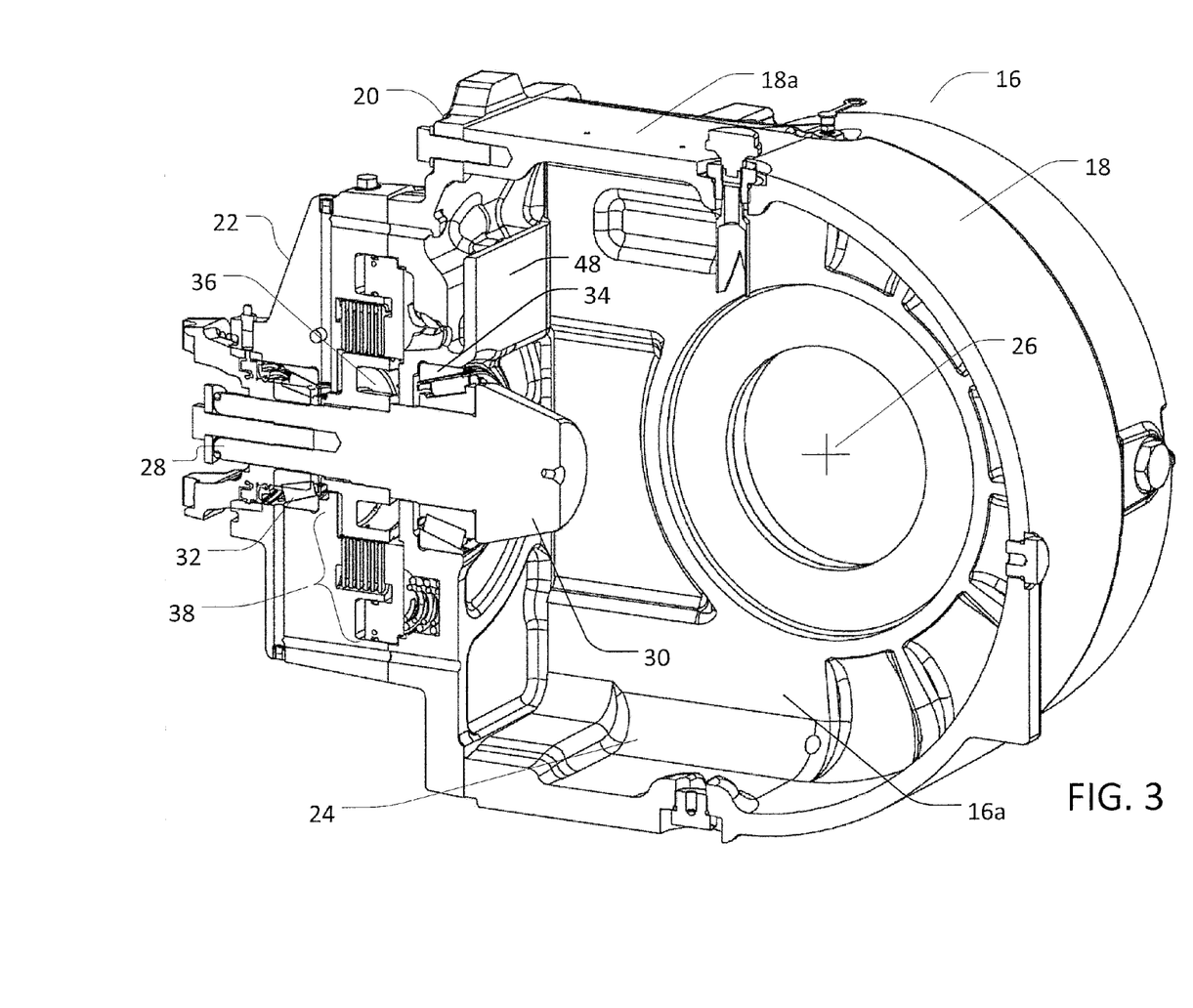
FIG. 3 is a perspective view, taken along plane 3 of FIG. 2, of internal components of the differential of FIG. 2 including components of the lubrication apparatus.

Referring now also to FIGS. 2 and 3, transmission 14 may include a differential 16 which may include a differential housing 18. In certain embodiments, housing 18 may be an assembly of housing body and cover components. For example, housing 18 may include front cover 20, which may be bolted (or otherwise attached) to a main body 18a of housing 18. Similarly, housing 18 may include top cover 22, which may be bolted (or otherwise attached) to front cover 20. It will be understood that these (and various other) housing parts may be formed or attached to housing 18 in various ways and that, in certain embodiments, an integral component may be utilized in place of two or more parts.

In certain embodiments, housing 18 may be configured to contain lubrication fluid within an internal housing cavity (e.g., primary sump 24 within primary differential cavity 16a). A ring gear (or other component) (not shown) may, for example be rotatably mounted within housing 18 and may accordingly rotate around center of rotation 26. In certain configurations, the ring gear (or other component) may extend, at least in part, into primary sump 24. As such, as the ring gear rotates it may splash lubrication fluid (e.g., oil) from primary sump 24 to various other locations within primary cavity 16a.

Differential drive shaft ("DDS") 28 may extend into differential housing 18. For example, DDS 28 may pass through both front cover 20 and top cover 22 and extend into primary differential cavity 16a. In certain embodiments, DDS 28 may include pinion gear 30, which may mesh with a ring gear (not shown) of differential 16. DDS 28 may, accordingly, provide drive power from a power source (e.g., power source 12) to two associated half-axles (not shown)

via the ring gear (not shown) rotating around center of rotation 26. In certain embodiments, DDS 28 may be supported by various bearings, such as tail bearing 32 and head bearing 34.

Figure 4:
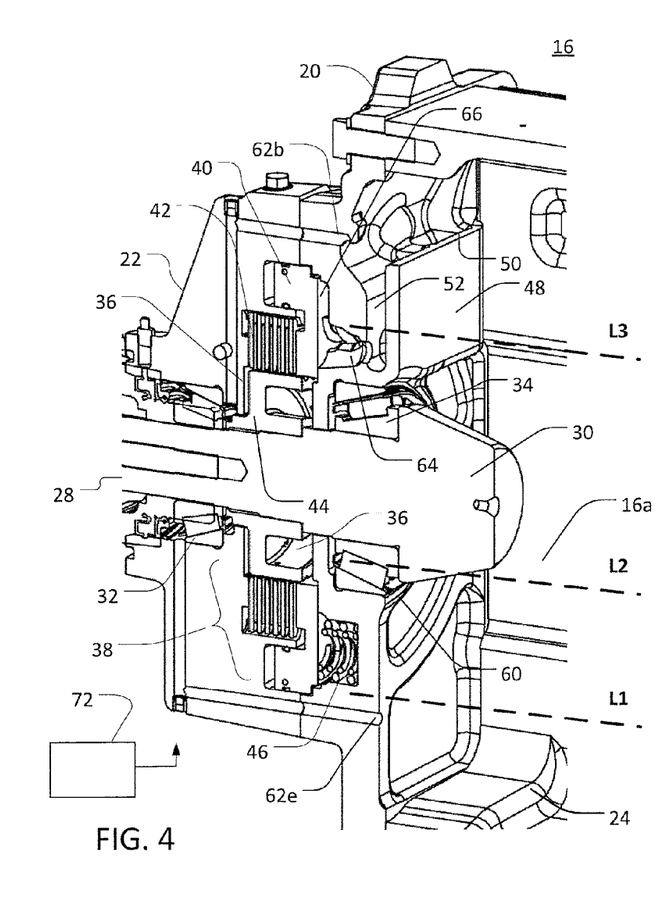
FIG. 4 is an enlarged view of a portion of FIG. 3.

Referring now also to FIG. 4, an enlarged view of differential 16 is presented, including an enlarged view of DDS 28, front cover 20 and top cover 22. In certain embodiments, one or both of the front cover 20 and top cover 22 may define component cavity 36, a cavity for containing various components (e.g., various rotating components) and which may be configured in various shapes. Component cavity 36 (as various other components described herein) may be manufactured in a variety of known ways, For example, in certain embodiments, component cavity 36 may be manufactured to include one or more bores into top cover 22 or front cover 20.

As depicted in FIG. 4, component cavity 36 may include a component to be lubricated, such as park brake 38. Park brake 38 may include, for example, piston 40, plates 42, and hub 44, with a portion of plates 42 mounted to hub 44 and a portion of plates 42 mounted to top cover 22 (or to another feature that is fixed relative to the rotation of DDS 28). Hub 44 may, in turn, be mounted (e.g., through a splined connection) to DDS 28. In this way, it will be understood, pressure applied to plates 42 by piston 40 may cause a frictional force that resists rotation of DDS 28, with a corresponding generation of heat. In certain embodiments, bias members (e.g., spring 46) may be provided to impart a biasing force on piston 40. As depicted in FIG. 4, for example, a default state of park brake 38 may be an engaged state (i.e., a state of resisting rotation of DDS 28 through frictional forces between plates 42). As such, spring 46 may impart a default braking force on piston 40 (generally to the left, in FIG. 4), which may be countered by a hydraulic (or other) actuator (not shown) in order to release plates 42 and allow rotation of DDS 28.

In light of the heat generation and general wear that may occur for a rapidly spinning component, it will be understood that it may be beneficial to lubricate park brake 38 (and its various components) during operation of park brake 38 or DDS 28. In certain embodiments, accordingly, various lubrication passages may be utilized in order to carry lubrication fluid (e.g., lubrication fluid included in primary sump 24) to park brake 38. In certain embodiments, lubrication passages may be configured to carry lubrication fluid directly to park brake 38. In certain embodiments, as discussed in greater detail below, lubrication passages may be configured to carry lubrication fluid to park brake 38 via various other components associated with differential 16. For example, lubrication passages may be configured to carry lubrication fluid to bearing 32 or 34, then on to park brake 38. In this regard, it will be understood that various surfaces of bearings 32 and 34 may themselves define relevant flow passages in the contemplated lubrication apparatus. For example, oil provided at one side of a bearing may flow across to the other side of the bearing, by passing through various spaces between various bearing features.

As also noted above, the level of fluid in a lubrication sump (e.g., primary sump 24) may vary among various vehicles, operating conditions, transmission designs, and so on with respect to differential 16, examples of nominal oil levels may be represented as a lower fluid level L1, an intermediate fluid level L2, and a higher fluid level L3. It will be understood that the height of these levels may influence the degree of lubrication of various components of differential 16 while also effecting the amount of windage losses imposed by the passage of moving components through the oil. At each of these fluid levels, passage of components (e.g., a differential ring gear) through primary sump 24 may result in significant transport of oil (i.e., through splashing, throwing, carrying, and so on) up into the general area of primary cavity 16a.

As such, in order to advance lubrication of various components (e.g., bearings 32 and 34 and park break 38), it may be useful to configure a feature to catch or collect the splashed/thrown/carried oil for redistribution to appropriate locations. For example, catchment feature 48, or a similar component, may be provided. Catchment feature 48, for example, may be formed on an internal portion of front cover 20 and may extend, at least in part, into primary cavity 16a. In certain embodiments, catchment feature 48 may include a lip 50 extending away from primary sump 24, which may form a reservoir 52 within which oil may collect. In certain embodiments, a top edge of lip 50 may extend above a particular oil level of primary cavity 16a. As discussed above, rotation of a ring gear within differential 16 may splash and carry oil from primary sump 24 up into primary cavity 16a. Some of this oil may accordingly be collected within reservoir 52.

Figure 5:
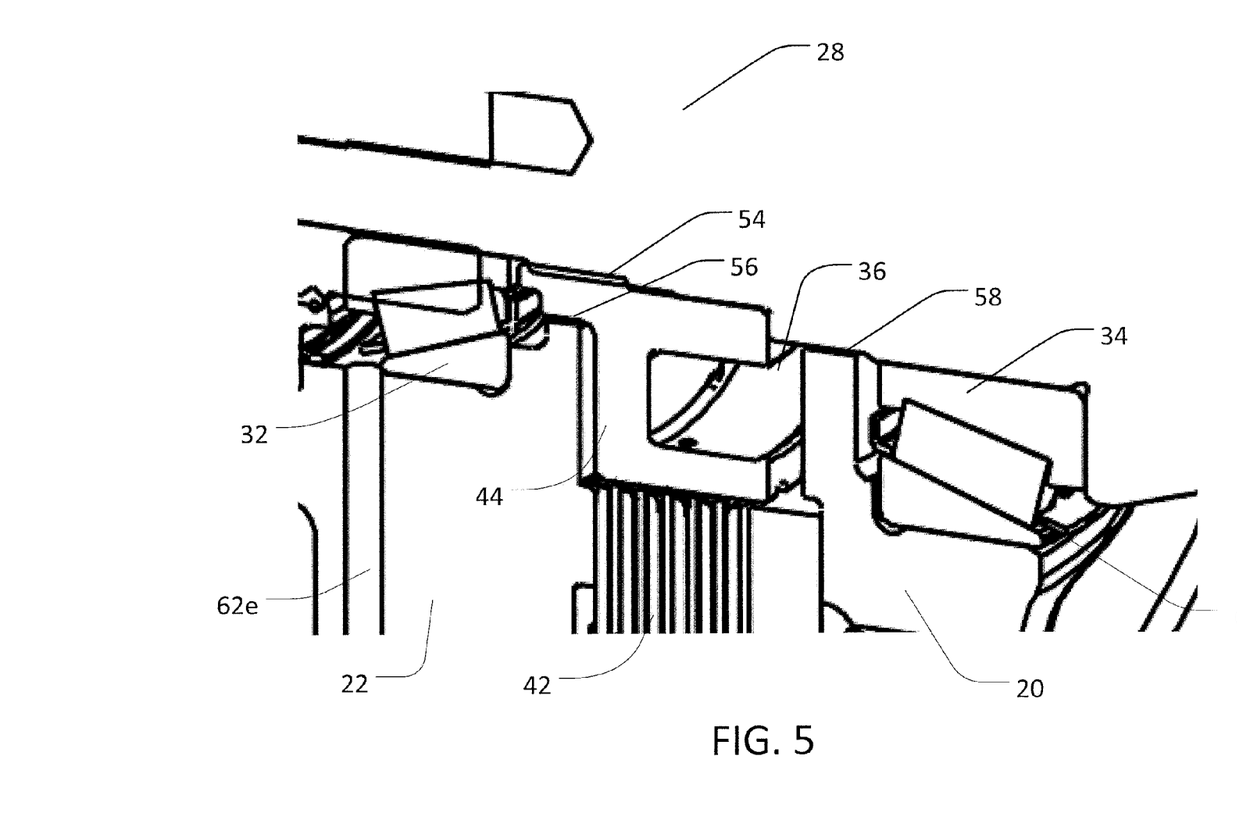
FIG. 5 is an enlarged view of a portion of FIG. 3.

Referring now also to FIG. 5, an enlarged view is presented of certain interfaces between park brake 38, component cavity 36, bearings 32 and 34, front cover 20, and top cover 22. Hub 44 of park brake 38 may be attached via splined connection 54 to DDS 28, whereby friction between plates 42 may act to slow or stop the rotation of both park brake 38 and DDS 28. In certain embodiments, to facilitate flow of lubricating oil into component cavity 36, various flow passages may be provided. For example, an annular gap (e.g., annular gap 56 between top cover 22 and hub 44) may provide a flow path between tail bearing 32 and component cavity 36. Likewise, an annular gap (e.g., annular gap 58 between front cover 20 and DDS 28) may provide a flow path between head bearing 34 and component cavity 36. In certain embodiments, the height of these gaps 56, 58 may accordingly regulate the amount of oil that may flow from bearings 32, 34 into component cavity 36 for a particular head of oil pressure (e.g., as provided by oil filling primary sump 24 or catchment feature 48.

In certain embodiments, opening 60 may lead from head bearing 34 to primary cavity 16a. In this way, for example, head bearing 34 may be lubricated by oil from primary sump 24 (e.g., through splashing or through an oil level that submerges part of opening 60). Similarly, depending on the oil level within primary cavity 16a, oil may drain from head bearing 34 back to primary cavity 16a through opening 60 (or vice versa). Other configurations may also be possible, however, including lubrication of head bearing 34 by one or more flow passages extending from catchment feature 48.

Figure 6A:
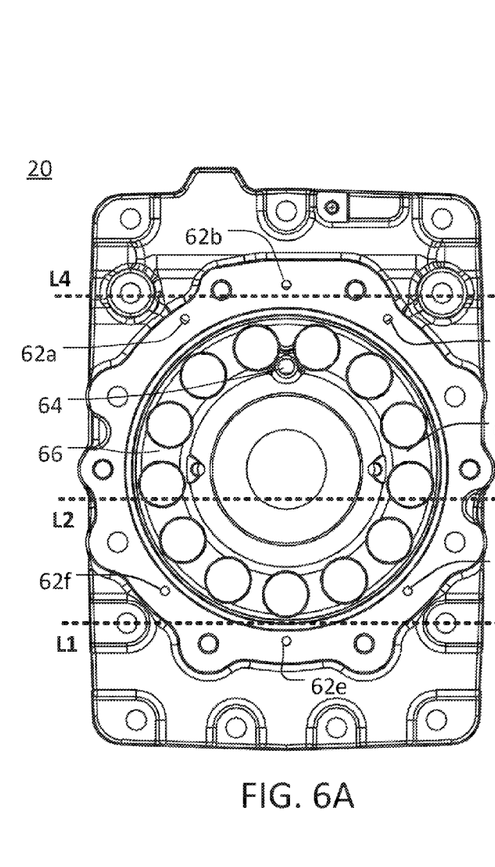
FIGS. 6A and 6B are front and back perspective views of a front cover of the differential of FIG. 2, including components of the lubrication apparatus.
Figure 6B:
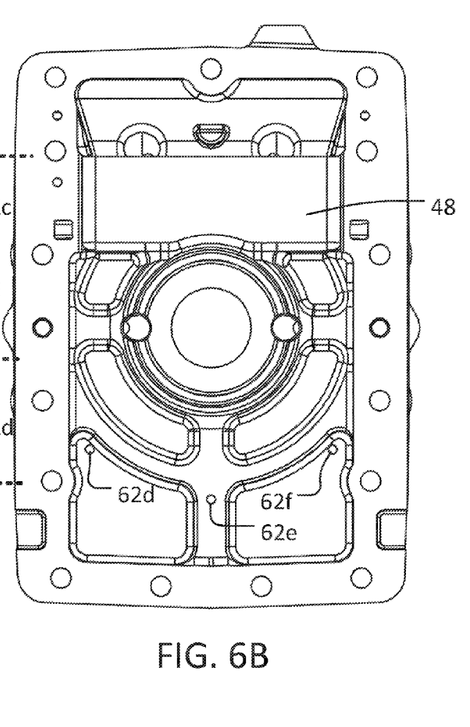
Figure 7:
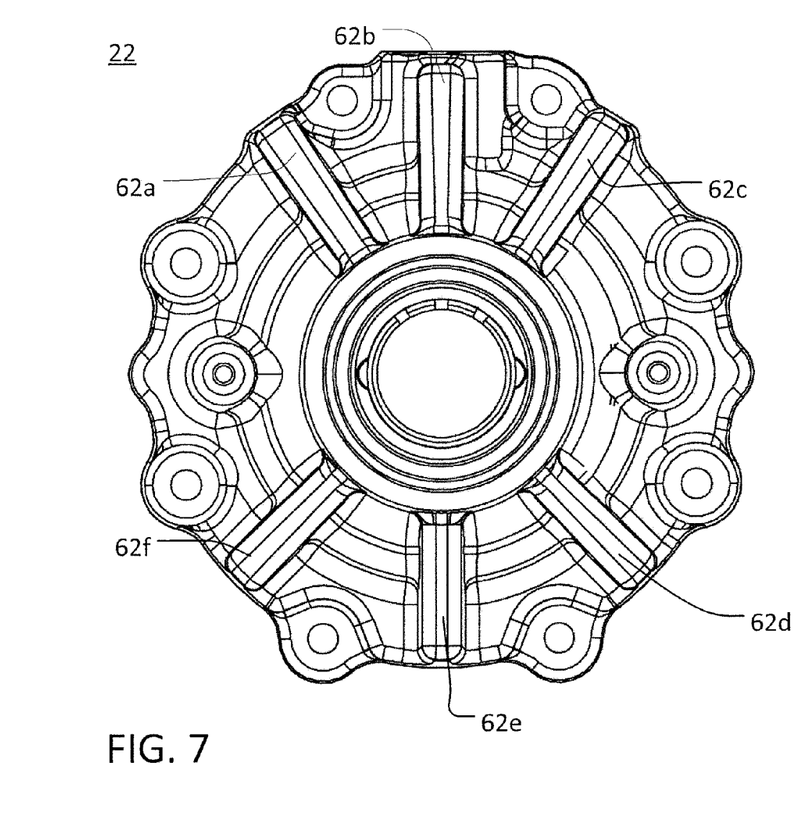
FIG. 7 is a front view of a cover of the differential of FIG. 2, including components of the lubrication apparatus.

Referring now also to FIGS. 6A and 6B, front and rear views of front cover 20 are presented. Depending on various factors, catchment feature 48 may be configured to extend across various portions of the internal face of front cover 20. As depicted in FIG. 6B, for example, catchment feature 48 may extend across the entire portion of front cover 20 (or another internal area of differential housing 18) that is exposed to primary cavity 16a. In this way, for example, a significant amount of splashed/carried oil may be captured by catchment feature 48.

In certain configurations, various fluid flow passages may extend from primary cavity 16a (or another area containing lubrication fluid) toward various moving components. For example, passages 62 may extend through front cover 20 from primary cavity 16a. Passages 62 may vary in number and configuration, as well as function. For example, certain passages 62 may primarily provide flow paths for lubrication from primary cavity 16*a* (or other areas) to various moving components (e.g., bearing 32), other passages 62 may primarily provide escape paths for trapped air, and other passages 62 may primarily provide lubrication drainage. It will be understood, however, that various other configurations may be possible. For example, as depicted in FIGS. 6A and 6B, six passages 62*a-f* are provided, with three passages 62*a-c* in an upper area of front cover 20 and three passages 62*d-f* in a lower area of front cover 20. As can be seen, even when reservoir 52 is completely filled (i.e., filled with oil to oil level L4), oil passage 62*b* may be above the local oil level (i.e., level L4) provided by catchment feature 48. Accordingly, for example, passage 62*b* may usefully serve as a vent for air that might otherwise be trapped within the lubrication apparatus. In contrast, for example, because passages 62*a* and 62*c* are located below oil level L4, these passages may usefully serve to direct oil from catchment feature 48 toward various moving components.

Passages 62*d-f* may also serve various purposes. In certain embodiments, such purposes may depend, at least in part on the nominal oil level within primary sump 24. For example, if oil within primary sump 24 is around level L1, the entrance of passage 62*e* into front cover 20 may be submerged in oil, which may result in some oil flowing into passage 62*e* from primary sump 24, due to the pressure head of oil above the entrance to passage 62*e*. As such, in certain embodiments, flow of oil from primary cavity 16*a* into passage 62*e* may be utilized to lubricate various components. Further, with oil at level L1 oil may not necessarily flow from primary sump 24 into passages 62*f* and 62*d*. As such, in certain embodiments, flow of oil into primary cavity 16*a* from passages 62*f* and 62*d* may serve to drain oil away from various components. It will be understood, however, that various other configurations may be possible, and that the role of a given flow passage 62 in the lubrication apparatus may vary with the level of oil within primary sump 24. For example, if oil rises to level L2 within primary cavity 16*a*, this may cause oil to flow into each of passages 62*d-f* from primary cavity 16*a*.

Referring now also to FIGS. 7-10, various views of top cover 22 are presented. It will be understood, with respect to FIG. 7, that portions of the indicated passages 62 may be contained within top cover 22. Accordingly, indication of various fluid passages 62 in FIG. 7 may be viewed as indicating the location of the fluid passages 62 within top cover 22, with actual view of fluid passages 62 in FIG. 7 being blocked by the enclosing front surface of top cover 22.

Figures 8, 9:
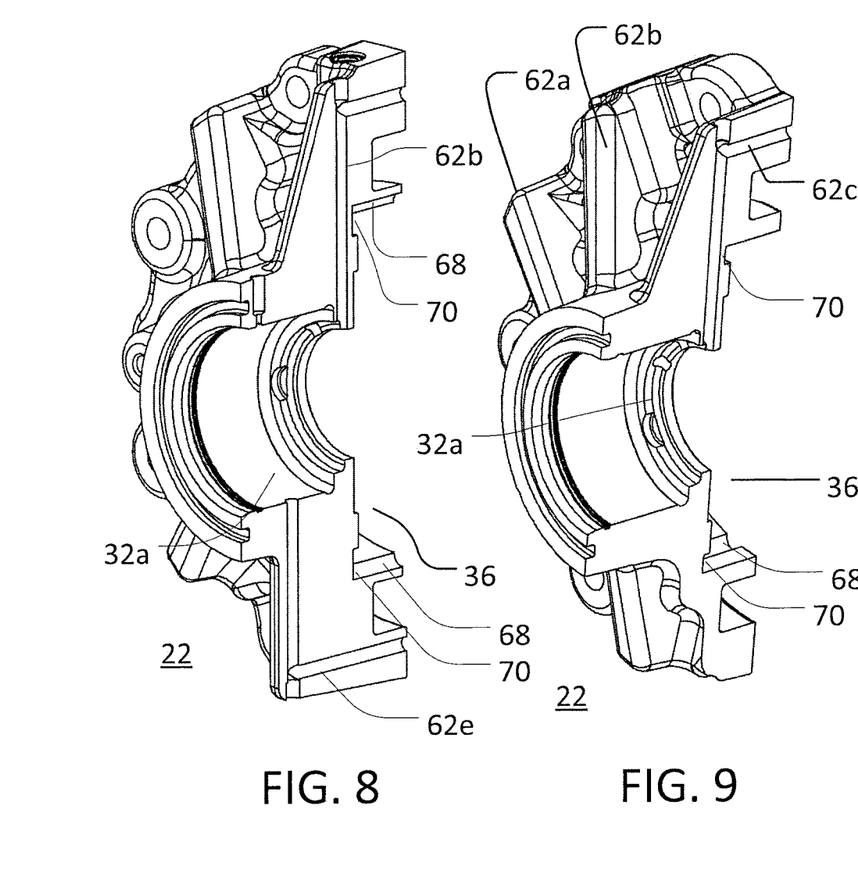
FIGS. 8-10 are cut-away perspective views showing various internal components of the cover of FIG. 7.
Figure 10:
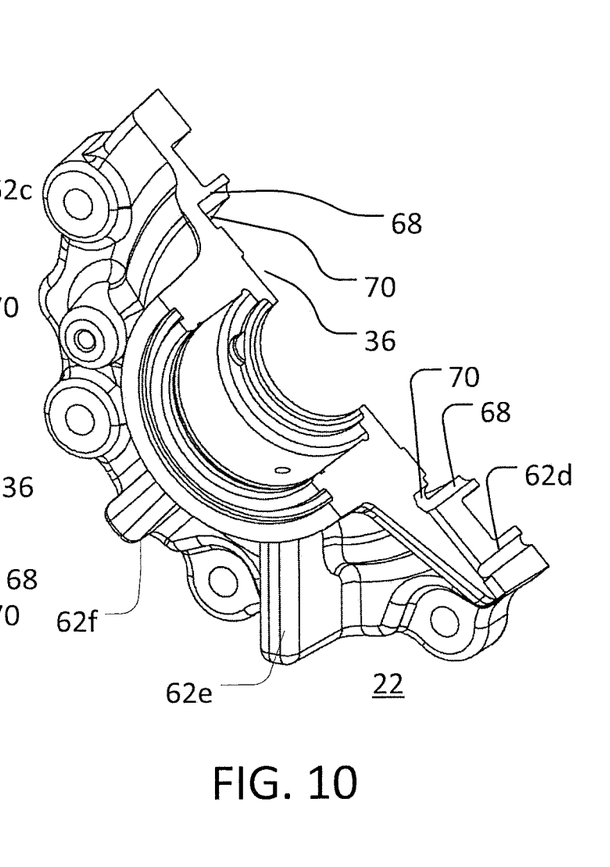

It can be seen that passages 62*a-c* may extend through front cover 20, into top cover 22, and down to bearing 32. Likewise, passage 62*e* may extend through front cover 20, into top cover 22, and up to bearing 32. In this way, for example, with sump oil at level L1, passages 62*a* and 62*c* may carry oil from catchment feature 48 to tail bearing 32 (location 32*a* of which is indicated in FIGS. 8-10), and passage 62*b* may vent air from tail bearing 32 back into the upper portion of primary cavity 16*a*. Passage 62*e*, meanwhile, may provide a drainage path for lubrication fluid from tail bearing 32 back to primary cavity 16*a* and primary sump 24. Further, in certain embodiments, passages 62*d* and 62*f* may extend through front cover 20 and top cover 22, providing a fluid flow path from primary cavity 16*a* to component cavity 36. In this way, for example, passages 62*d* and 62*f* may usefully facilitate lubrication of park brake 38 including through drainage of oil.

For the example configuration of FIGS. 4-10, therefore, with oil at example level L1 within primary cavity 16*a*, oil may be splashed out of primary sump 24 by the ring gear (or other components) and captured by catchment feature 48. Oil may then flow from catchment feature 48 through passages 62*a* and 62*c* to tail bearing 32 (and surrounding spaces). Oil may then pass across tail bearing 32, through annular gap 56 and into component cavity 36. Further, air from component cavity 36 may be vented back to primary cavity 16*a* by passage 62*b*. The oil may lubricate various components of park brake 38 and tail bearing 32, and may then be drained back to primary sump 24*a* by passage 62*e* (from tail bearing 32) and passages 62*d* and 62*f* (from component cavity 36).

Similarly, oil may flow through annular gap 58 between head bearing 34 and component cavity 36. In certain embodiments, for example, oil may splash (or otherwise flow) through opening 60 from primary cavity 16*a* to head bearing 34. Oil may then flow across bearing 34, through annular gap 58, and into component cavity 36. (It will be understood that an opposite flow path may also be possible, in which oil flows drains from component cavity 36 through annular gap 58 and then out opening 60 into primary cavity 16*a*.)

Various other flows of lubrication fluid (e.g., oil) or trapped gas may occur depending, for example, on the level of oil in primary sump 24*a* (or other factors). For example, if oil in primary cavity 16*a* rises to level L2, oil may flow through passages 62*d* and 62*f* and into component cavity 36, thus providing lubrication of park brake 38. (In such a case, as also noted above, passage 62*b* may provide a useful escape path from air that might otherwise be trapped in component cavity 36.) If, in contrast, oil in primary cavity 16 is not so high (e.g., is at level L1), passages 62*d* and 62*f* may provide a drainage path for oil from component cavity 36 to primary cavity 16*a*. In this way, for example, appropriate circulation of oil through component cavity 36 may be effected.

In certain embodiments, passages 62 may generally extend radially within top cover 62. As such, for example, passages 62*b* and 62*e* may provide a substantially vertical flow path for lubrication and drainage of components, after a substantially axial flow path from primary cavity 16*a* or catchment feature 48. Passages 62*a*, 62*c*, 62*d* and 62*f*, in contrast, may provide a flow path at an angle to vertical, along with a substantially axial flow path directly from primary cavity 16*a* or catchment feature 48.

Other configurations may also be possible. For example, flow paths may be provided that deviate from the primary axial direction (e.g., via a generally slanted flow passage leading from catchment feature 48 to tail bearing 32 or from tail bearing 32 to primary cavity 16*a*). Likewise, flow paths may be provided that deviate from vertical to varying degrees. For example, although portions of passage 62*a* are depicted as oriented at roughly 45 degrees from vertical other orientations may be possible (as with the various other passages 62).

In certain embodiments, oil may enter component cavity 36 in various ways. For example, referring back to FIGS. 4, 6A and 6B, when piston 40 of park brake 38 engages (i.e., moves to the left), this may allow oil to flow into component compartment 36 through various channels. For example, opening 64 may be provided between reservoir 52 of catchment feature 48 and component cavity 36. When park brake 38 is not engaged, piston 40 of park brake 38 may block opening 64 (in whole or in part), thereby preventing oil (at least in part) from flowing through opening 64 into component cavity 36. As such, when park brake 38 is not engaged, the various passages 62 (and annular gaps 56 and 58) may provide the primary flow of oil into and out of component cavity, the primary venting of gas from component cavity 36, and so on. However, when park brake 38 is engaged (i.e., when lubrication and cooling needs for park brake 38 may be particularly high), the movement of piston 40 away from opening 64 may cause component cavity 36 to be flooded with oil from catchment feature 48 and may allow gas to escape to primary cavity 16a through opening 64. This may provide enhanced lubrication and cooling for the park brake 38 when the park brake 38 is engaged.

As also noted above, when park brake 38 engages and piston 40 of park brake 38 blocks opening 64, piston 40 may not necessarily block opening 64 entirely. Accordingly, even if park brake 38 is engaged and piston 40 is blocking opening 64, oil may still flow from reservoir 52 of catchment feature 48 through opening 64. Fluid may then, for example, flow down annular space 66, thereby providing additional useful lubrication and lubrication drainage.

In certain embodiments, a lubrication apparatus contemplated by this disclosure may be configured to operate in conjunction with a lubrication pump (e.g., pump 72 in FIG. 4) in addition or as an alternative to catchment feature 48. For example, in certain embodiments, oil may be pumped by a lubrication pump into various of flow passages 62 for lubrication of the bearings 32, 34 or park brake 38. As such, for example, certain of flow passages 62 may extend to or otherwise include a pump inlet (not shown) for receiving lubrication fluid from the pump. Correspondingly, in certain embodiments, certain flow passages 62 (e.g., flow passages 62d-f) may be configured to drain oil back to a pump reservoir (not shown) which may be remotely located from primary sump 24.

Likewise, it will be clear from the discussion herein that certain embodiments of the disclosed apparatus may be configured to lubricate only a portion of the components noted above (or various other components alone or in varying combinations). For example, passages 62 may be configured to lubricate only one of bearings 32 and 34 or only park brake 38, or to lubricate various combinations of these and other components.

In certain embodiments, other features may be included. For example, various slots (e.g., axial slots 68) may be included in an inner wall of component cavity 36 (or another cavity, such as a cavity surrounding head bearing 34). Such slots 68 may, for example, assist in appropriately distributing oil throughout component cavity 36 and in appropriately transporting oil between component cavity 36 and primary cavity 16a. For example, slots 68 may provide a flow path past various components of park brake 38 in order to facilitate easier movement of oil around and through component cavity 36. Further, in certain embodiments, slots 68 may be in fluid communication with various flow passages 62 to facilitate transport of oil between component cavity 36 and other locations in differential 16. For example, a groove (e.g., annular groove 70) may interconnect various of slots 68 and may also connect to various flow passages (e.g., drainage flow passage 62d and 62f) for transport of oil between component cavity 36 and primary sump 24.

It will be understood that various embodiments may include additional (or alternative) features and flow passages to those discussed above. Similarly, various embodiments may not include certain features or flow passages discussed above. For example, certain embodiments may not include annular groove 70 (as discussed above), may include a different configuration of slots 68, and so on.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lubrication apparatus for lubrication of one or more components, the lubrication apparatus comprising:
   a housing with an internal housing cavity containing lubrication fluid at a lubrication fluid sump level;
   a catchment feature having a lip and a reservoir, the lip extending in a substantially radial direction with respect to a rotation axis about which is disposed a first component of the one or more components within the internal housing cavity, the lip extending to an upper edge that is disposed within the internal housing cavity above, at least in part, the lubrication fluid sump level of the internal housing cavity, the reservoir being disposed below the upper edge of the lip and, at least in part, extending below the lubrication fluid sump level; and
   a first lubrication passage extending from the catchment feature into the housing;
   wherein the lip and the reservoir of the catchment feature catch lubrication fluid splashed above the lubrication fluid sump level; and
   wherein the first lubrication passage directs lubrication fluid from the catchment feature to the first component of the one or more components.

2. The lubrication apparatus of claim 1, wherein a second lubrication passage one of vents air away from the one or more components and drains lubrication fluid away from the one or more components.

3. The lubrication apparatus of claim 1, wherein the first component includes a first bearing supporting a rotatable shaft.

4. The lubrication apparatus of claim 3, further comprising:
   a component cavity containing, at least in part, a second component of the one or more components; and
   a first annular gap providing a first annular flow path between the first bearing and the component cavity;
   wherein lubrication fluid flows through the first annular flow path between the first bearing and the component cavity to lubricate the second component.

5. The lubrication apparatus of claim 4, wherein the second component surrounds, at least in part, the rotatable shaft.

6. The lubrication apparatus of claim 5, wherein the second component includes a park brake mounted to the rotatable shaft.

7. The lubrication apparatus of claim 6, wherein a piston of the park brake, in a first configuration, blocks a flow path of lubrication from the internal housing cavity into the component cavity.

8. The lubrication apparatus of claim 4, further comprising:
- a second bearing supporting the rotatable shaft; and
- a second annular gap providing a second annular flow path between the second bearing and the component cavity;
- wherein lubrication fluid flows through the second annular flow path between the second bearing and the component cavity to lubricate the second component.

9. A lubrication apparatus for lubrication of one or more components, the lubrication apparatus comprising:
- a housing having an internal housing cavity that contains lubrication fluid at a lubrication fluid sump level and a component cavity that contains a first component of the one or more components;
- a first bearing supporting a shaft that is rotatable about a rotation axis, the first bearing located on a first side of the component cavity;
- a first lubrication passage directing lubrication fluid to the first bearing;
- a first annular gap providing a first annular flow path between the first bearing and the component cavity, wherein lubrication fluid from the first lubrication passage flows through the first bearing and the first annular flow path to lubricate the first component;
- a catchment feature having a lip and a reservoir, the lip extending in a substantially radial direction with respect to the rotation axis to an upper edge that is disposed within the internal housing cavity above, at least in part, the lubrication fluid sump level of the internal housing cavity, the reservoir being disposed below an upper edge of the lip and, at least in part, below the lubrication fluid sump level; and
- a second lubrication passage extending from the catchment feature into the housing;
- wherein the lip and the reservoir of the catchment feature catch lubrication fluid splashed above the lubrication fluid sump level by movement of the one or more components; and
- wherein the second lubrication passage directs lubrication fluid from the catchment feature to the component cavity.

10. The lubrication apparatus of claim 9, wherein a third lubrication passage one of vents air away from the one or more components and drains lubrication fluid away from the one or more components.

11. The lubrication apparatus of claim 9, wherein the first component surrounds, at least in part, the rotatable shaft.

12. The lubrication apparatus of claim 11, wherein the first component includes a park brake mounted to the rotatable shaft.

13. The lubrication apparatus of claim 12, wherein a piston of the park brake, in a first configuration, blocks a flow path of lubrication from the internal housing cavity into the component cavity.

14. The lubrication apparatus of claim 9,
- wherein a second annular gap provides a second annular flow path between the second bearing and the component cavity; and
- wherein lubrication fluid flows through the second annular flow path between the second bearing and the component cavity to lubricate the first component.

* * * * *